March 28, 1950  G. E. SHAFER  2,501,854
CORRUGATED CONDUIT
Filed July 29, 1946

INVENTOR
GEORGE E. SHAFER
BY Allen & Allen
ATTORNEYS.

Patented Mar. 28, 1950

2,501,854

UNITED STATES PATENT OFFICE 2,501,854

CORRUGATED CONDUIT

George E. Shafer, Middletown, Ohio, assignor to Armco Steel Corporation, a corporation of Ohio Application July 29, 1946, Serial No. 686,978

4 Claims. (Cl. 285—185)

My invention relates to metal pipe, and deals primarily with problems involved in the making of joints between pipe sections, particularly in the field.

It has for its principal object the provision of means and a method of providing the operating equivalent of a telescoped joint between pipe sections which are of the same diameter. It is of particular utility in the field of corrugated pipe, and will be described in exemplary embodiments in this field; but it will be understood that the invention in its general aspect is not so limited.

Corrugated pipe, such as is used in culvert construction, is regularly manufactured in sections about 20 feet long. The standard 20-foot sections are made up from corrugated and curved, galvanized sheets which are riveted to form shorter pipe sections, usually about 2 feet long. These 2-foot sections are joined in the shop by lapping an end of one over the end of another by the distance of one full corrugation and riveting the parts together. The standard 20-foot sections regularly terminate at each end in an outwardly flaring portion of a corrugation, which is not counted in the length of the section.

In installing a pipe or culvert, the required number of standard sections are connected together in the field by some type of band or field joint. A band comprises a corrugated collar 7, 12 or 24 inches in axial length, with a cinching device, which may be an angle iron riveted to each end of the collar with bolts to draw the angle irons toward each other.

With each such field joint there is a gain of 2⅔ inches (the pitch length of standard culvert corrugations) over the standard length of the sections; and this complicates calculations of length. There is double metal for the width of the band, making the joint expensive. The expense involved is lessened by the distribution of it over 20 feet of pipe. It would be very heavy if distributed over substantially shorter lengths.

Thus it will be seen that the cost of field joints is a primary factor in dictating the length of standard pipe sections. There are many circumstances in which it would be highly advantageous to use shorter sections, say 6 to 8 feet long, or more or less, if this could be done economically. Advantages in transportation as well as the avoidance of cutting are among those to be expected.

An object of my invention is the provision of a joint for corrugated pipe sections, and a method of making it, which is much simpler, much lower in cost and more quickly and easily practiced than those hitherto known. It is my object to provide a joint which can be economically used with sections of any desired length, including sections so short that they could not economically be joined by the current methods of making field joints. It is an object of my invention to provide a joint which will not affect the over-all, rated length of conduit sections, and will enable a conduit to be built up from such sections on the basis of their rated lengths.

Designed primarily for field joints, my structure and method are applicable to factory-joining of prefabricated pipe sections also.

The above and other objects of my invention, which will be set forth hereinafter or will be apparent to one skilled in the art upon reading these specifications, I accomplish by that procedure and in those structures of which I shall now describe certain exemplary embodiments. Reference is had to the accompanying drawings, in which.

As indicated above, in the building up of initial culvert sections in the manufactring plant, sheets are lapped one full corrugation in the direction of the length of the culvert, and are riveted. This telescopic method, however, is not applicable to the making of joints in the field or elsewhere between prefabricated conduit sections, as will be clear. I have found that a joint of equal strength and rigidity may be made by providing an equivalent lapped relationship, but obtaining that relationship by causing the end of one of the sections to lie partly within and partly without the end of the adjacent section.

This structure and procedure are not restricted to corrugated pipe sections, since plain, cylindrical pipe sections may be joined in this way by interfitting and fastening with rivets or bolts, or by welding. With pipe sections having mating ridges and depressions at their respective ends, or with corrugated pipe, an advantage is obtained in that a constrictor fastening may be used.

Figure 1:
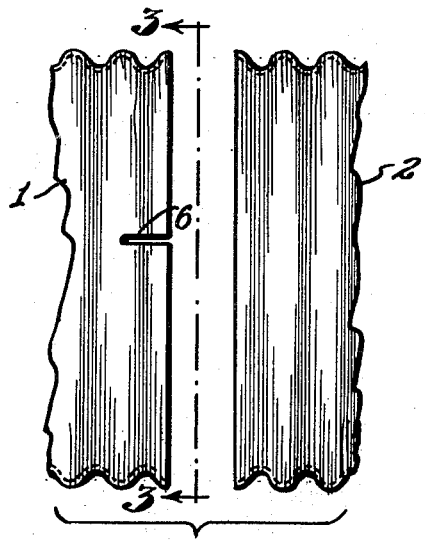
Figure 1 is an elevational view of adjacent ends of corrugated conduit sections prepared for joining in accordance with my invention.
Figure 2:
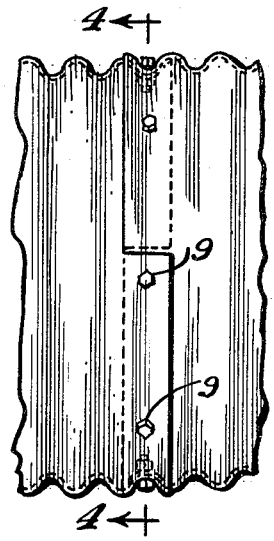
Figure 2 is a similar view of the sections after joining, and illustrating the employment of one kind of fastening means.
Figure 3:
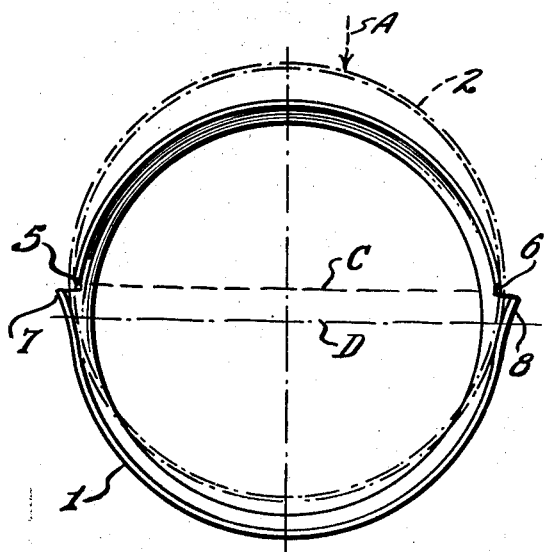
Figure 3 is an end elevation of a conduit section prepared for joining, and showing in dotted lines the initial position of the adjacent section, the view responding to line 3—3 of Figure 1.

Considering Figures 1 and 3, the index numerals 1 and 2 indicate adjacent ends of corrugated metal conduit sections to be joined. In the practice of my invention, I slit or slot one of the sections inwardly at opposite sides, as indicated at 5 and 6. The depth of the slits or slots is substantially the width of a full corrugation as indicated. The positions of the slots are important. As will be seen in Figure 3, I locate the slits or slots to one side of a diameter D of the conduit in which they are formed. The actual distance of the slots from the diameter D is determined generally by the thickness of the metal of the conduit. The slots are preferably so positioned that a line C, connecting the outside faces of the conduit adjacent the slots on the shorter arc side, will be substantially equal to the greatest inside diameter of the conduit. On the longer arc side, the edges of the metal may be bent or flared slightly outwardly, as indicated at 7 and 8 in Figure 3. When this is done, it is possible, as indicated in dotted lines in Figure 3, to pass the end of a culvert section 2 of the same size into the slots. When the culvert section 2 is then brought downwardly in the direction of the arrow A, a lapping engagement, one corrugation deep, will be formed between the culvert sections, approximately one-half of one section end lying within and approximately one-half lying without the end of the other section, as is clearly shown in Figures 2 and 4. This brings about the desired lapping engagement of the culvert sections and the only other requirement to form a strong and inseparable joint is a means for holding the sections in the lapped engagement aforesaid. This may be accomplished, as in Figure 2, by bolts 9 or by rivets if the joint is being made in the factory, or otherwise as hereinafter set forth.

I am not limited to the specific positioning of the slits or slots which has been set forth above. It is a positioning, however, which enables me to bring about the desired lapping engagement without forcing and without distorting the culvert parts. It is possible to employ other positionings and to compensate for the difference in external and internal diameters by distorting one or the other of the culvert sections. It is possible, for example, to limit the slits or slots farther from the diameter D than is illustrated in Figure 3. In this event it will be necessary either to distort the culvert section 1 during the engagement of the sections, or to engage the sections and then force section 2 into position downwardly in the direction A. In either event, a snap lock action will be produced to hold the culvert sections together after engagement. Nevertheless, for most uses, additional fastening means will be found desirable; and where this is the case, the placement of the slits or slots illustrated in Figure 3 will be found most desirable because it makes it easiest to engage the culvert sections.

The slitting or slotting, as well as the outward flaring of portions 7 and 8, may if desired, be accomplished by treating an end of each culvert section in a die.

Figure 4:
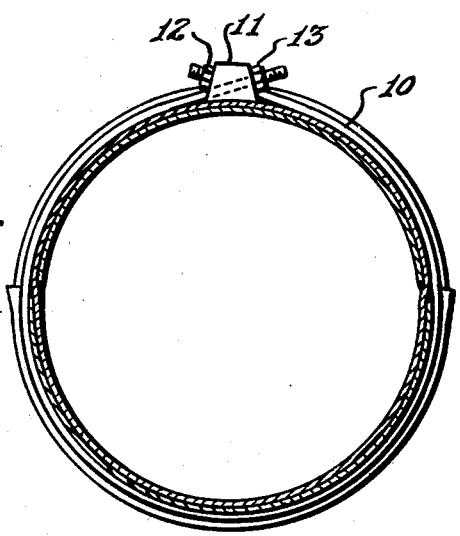
Figure 4 is a vertical, sectional view of a joint responding to line 4—4 of Figure 2, but showing another kind of fastening means.
Figure 5:
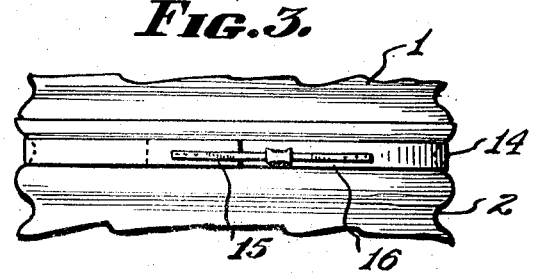
Figure 5 is a plan view showing yet another mode of binding the joined sections.

While bolts or rivets may be used as aforesaid, they involve the matching of perforations in the culvert section ends or the formation of concurrent perforations therein, and for most uses I prefer to employ fastening means in the nature of a constricting band. Such constricting means, however, need be only in the nature of a rod, a narrow strap, or the like, of a width to engage in the valley of a single corrugation, and are unlike the conventional corrugated bands in cost, bulk and weight. In Figure 4 I have shown a metal rod 10 passed around the conduit structure in the valley of the lapped corrugation. The ends of this rod are passed through perforations in a silo lug 11, are threaded, and are drawn tight with nuts 12 and 13. Another form of constricting band or clamp is shown in Figure 5 where I employ a strap 14 of galvanized metal of a length to pass around the conduit in the valley of a corrugation, and to provide a lap of relatively short length at the ends of the strap. Lengths of relatively thin and narrow metal strips 15 and 16, such as are used in banding shipping packages, are attached to the strap 14 at positions spaced from the ends thereof. This may be done by riveting, welding or otherwise. After the strap 14 has been passed about the conduit in the lapped corrugation, the ends of the metal strips 15 and 16 are brought together and are engaged by an ordinary banding tool or strap tightener whereby the strap 14 is tightened and its ends brought into lapping position. Thereupon, I fasten these ends in any suitable way, as by welding, crimping or the like. The banding tool is then released. The ends of the metal strips 15 and 16 may be fastened, if desired, but this is not necessary since the strain is taken by the welded or otherwise fastened strap 14. Inexpensive material may be employed for the strips 15 and 16, and if this material rusts away after a period of use of the conduit, the utility and rigidity of the conduit are not affected.

Other fastening means may be employed as will be evident to the skilled worker in the art in the light of these teachings.

Modifications may be made in my invention without departing from the spirit of it. Having described my invention in certain exemplary embodiments, what I claim as new and desire to secure by Letters Patent is:

1. In a conduit construction, corrugated pipe sections, one of said sections being cut inwardly of an end to substantially the depth of a full corrugation, the other of said sections having an end portion passing through said cuts and lying in substantial axial alignment with the first mentioned section, an end corrugation of each section lapping and matching with an end corrugation of the other, an end corrugation of one lying partly within and partly without the end corrugation of the other section, the cuts in said cut section lying to one side of a diameter thereof and dividing the circumference thereof into a larger arc segment and a smaller arc segment, said cuts being spaced in such a way that the chordal distance between the outside wall of the cuts at one side of the cuts is substantially equal to the greatest inside diameter of the pipe sections, and fastening means in addition to the pipe sections for fastening the said sections in the locked position.

2. The structure of claim 1 wherein said fastening means for holding said lapped sections together comprises band means lying substantially within the lapping corrugations.

3. The structure of claim 1 wherein portions of the cut section on the larger arc side of said cuts are flared outwardly.

4. In a conduit construction, corrugated pipe sections, one of said sections being cut inwardly of an end to substantially the depth of a full corrugation, the other of said sections having an end portion passing through said cuts and lying in substantial axial alignment with the first mentioned section, an end corrugation of each section lapping and matching with an end corrugation of the other, and end corrugations of one lying substantially half within and half without the end corrugation of the other section, the cuts in the said cut section being substantially diametrically opposite to each other, and fastening means in addition to the pipe sections for fastening the said sections in the lapped position.

GEORGE E. SHAFER.

REFERENCES CITED

The following references are of record in the file of this patent:

UNITED STATES PATENTS

| Number | Name | Date |
|---|---|---|
| 697,364 | Reichert | Apr. 8, 1902 |
| 898,510 | Schlafly | Sept. 15, 1908 |
| 919,997 | Zelch | Apr. 27, 1909 |
| 1,806,867 | Welsh | May 26, 1931 |